Sept. 6, 1927.　　　　　J. EDGAR　　　　　1,641,666
GEAR ROUGHING MACHINE
Filed Feb. 25, 1924　　　9 Sheets-Sheet 1
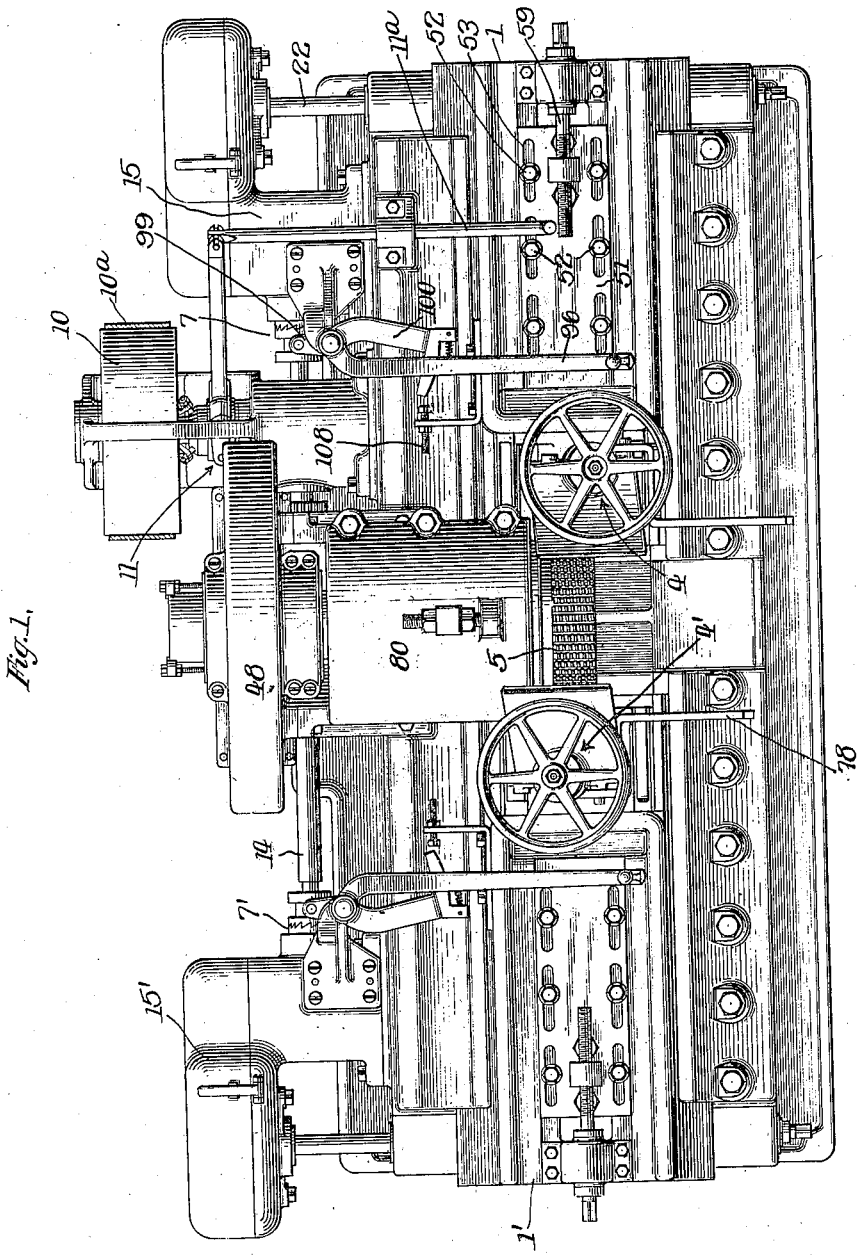
Inventor:
John Edgar,
By Chindahl, Parker & Carlson
Attys.

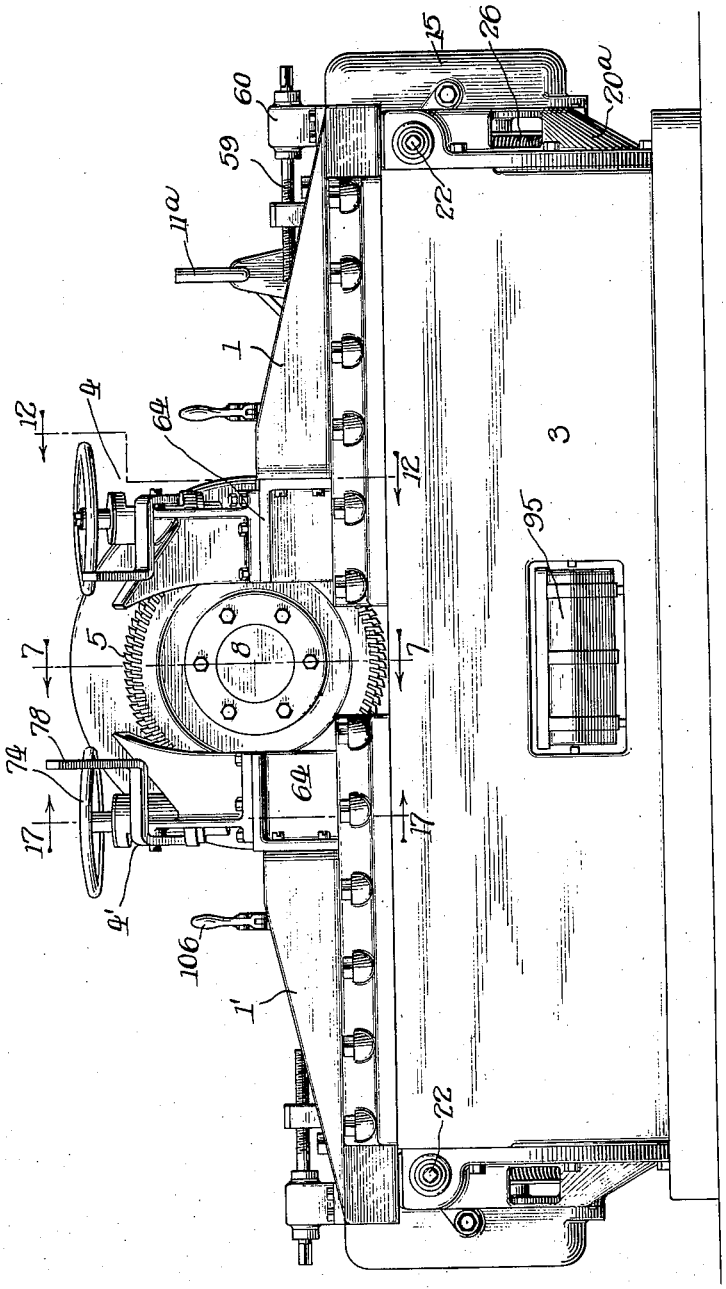

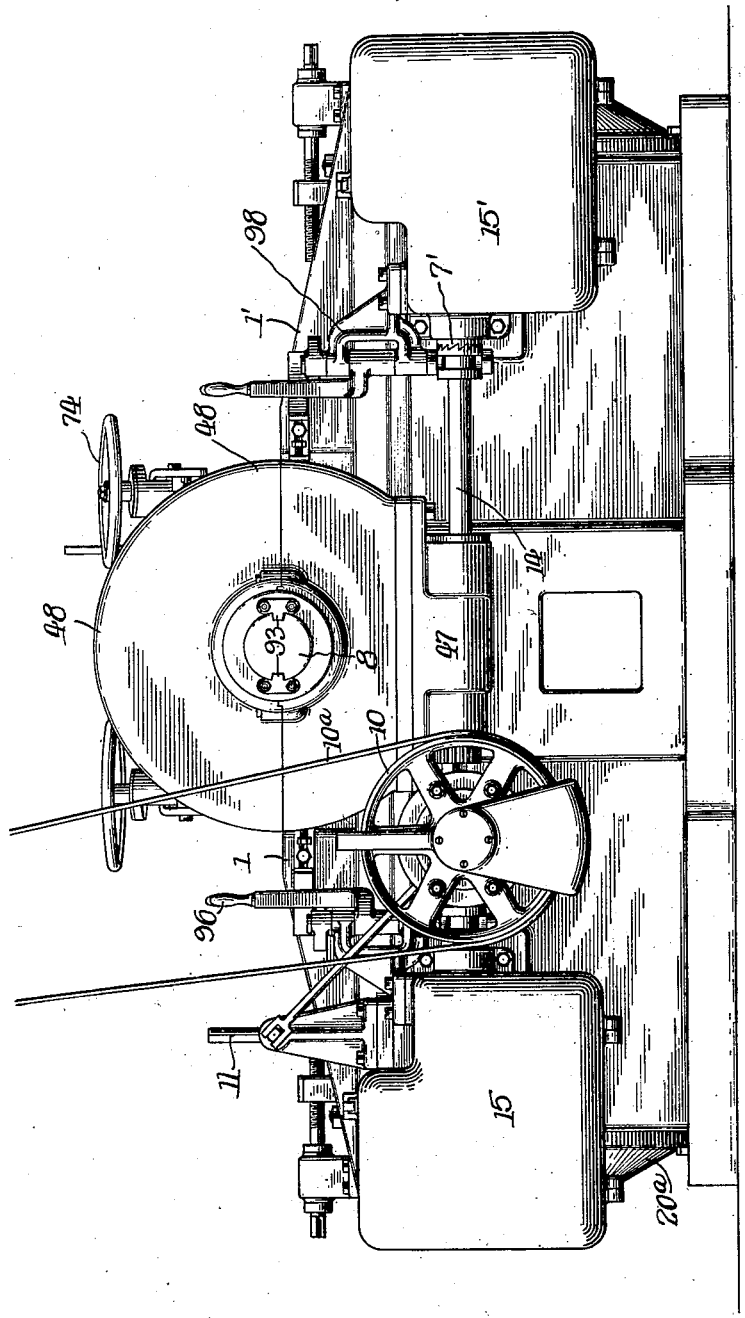

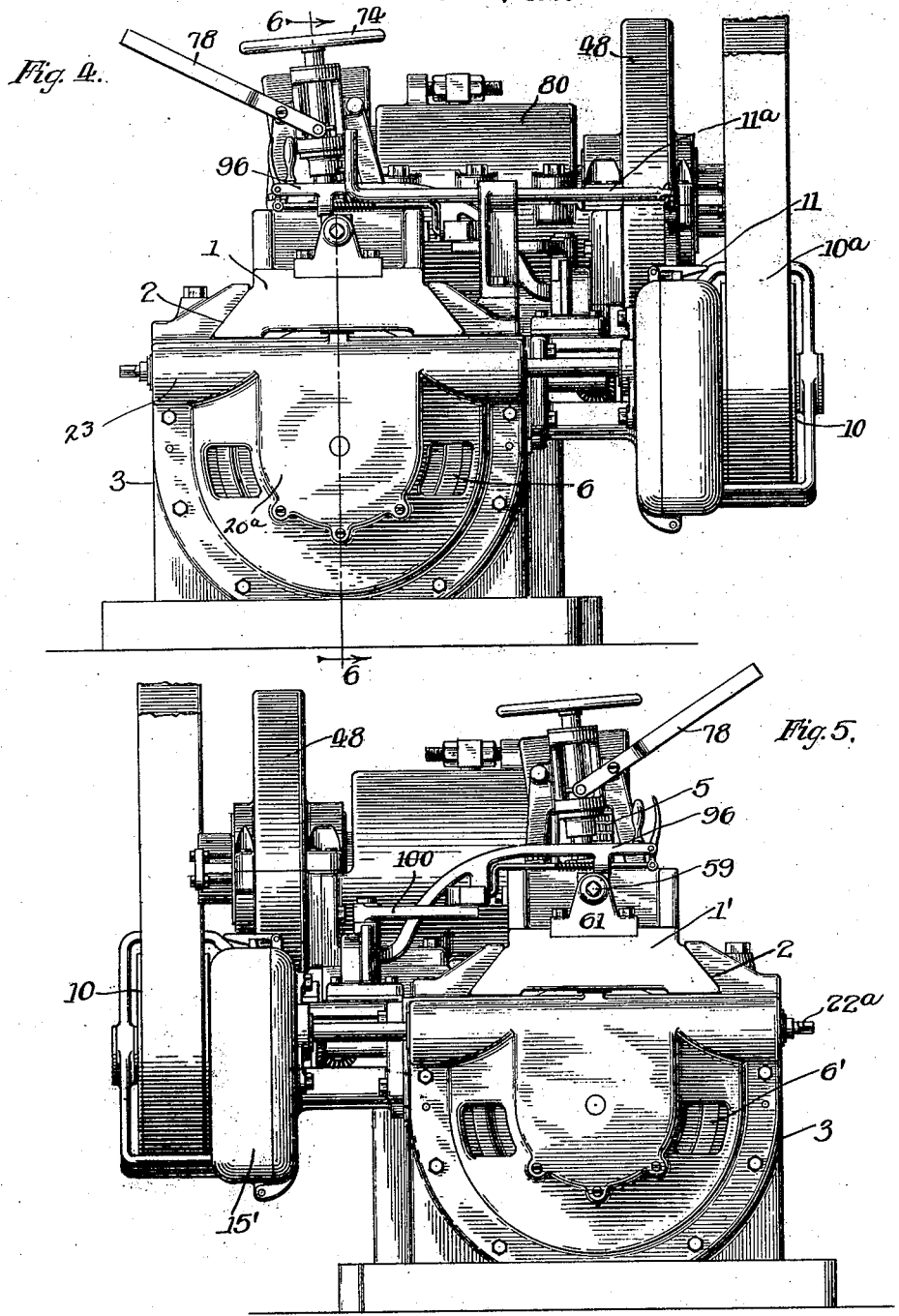

Sept. 6, 1927.
J. EDGAR
1,641,666
GEAR ROUGHING MACHINE
Filed Feb. 25, 1924     9 Sheets-Sheet 5
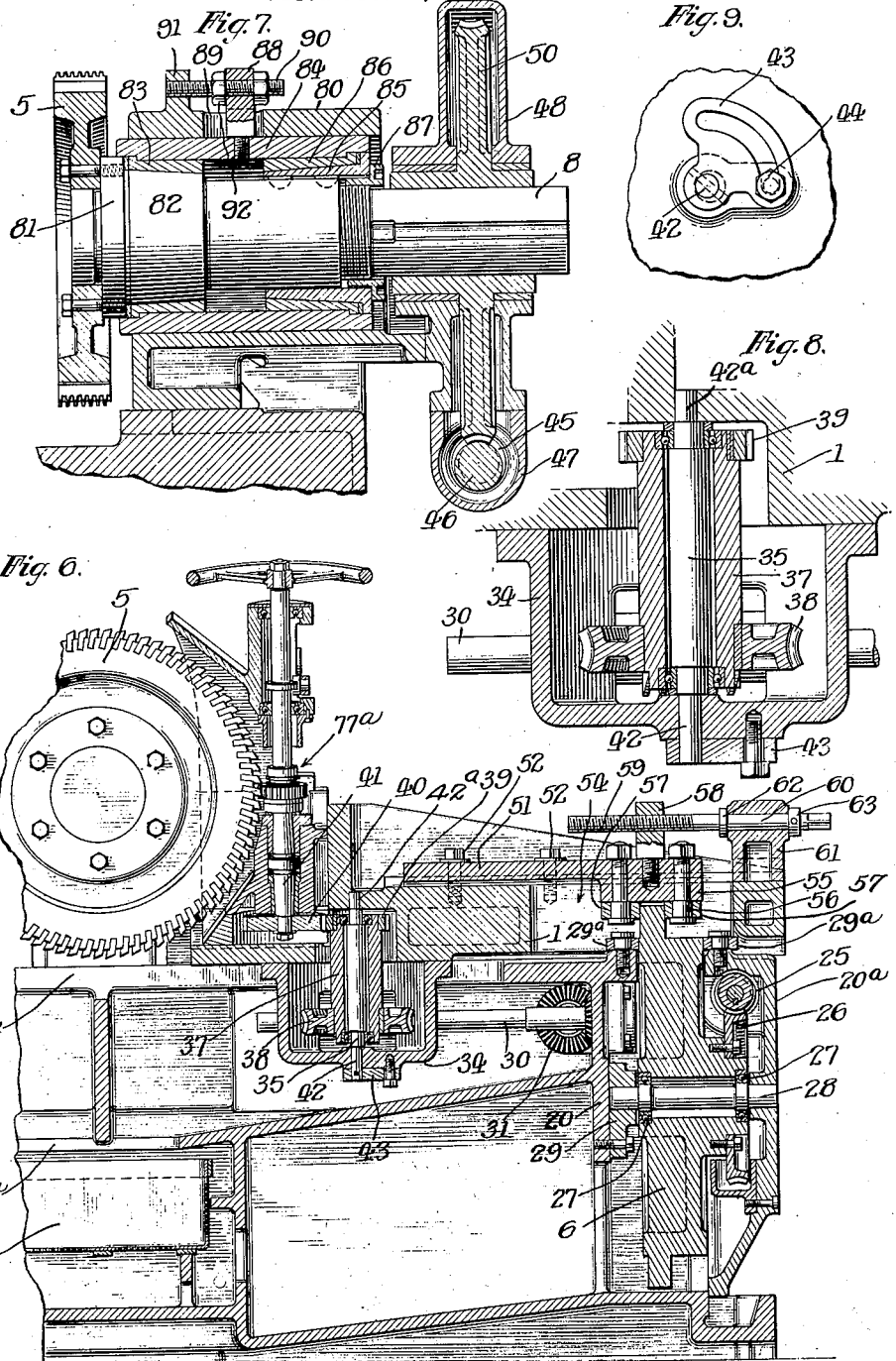
Inventor:
John Edgar,
By Chindahl, Parker & Carlson
Att'ys.

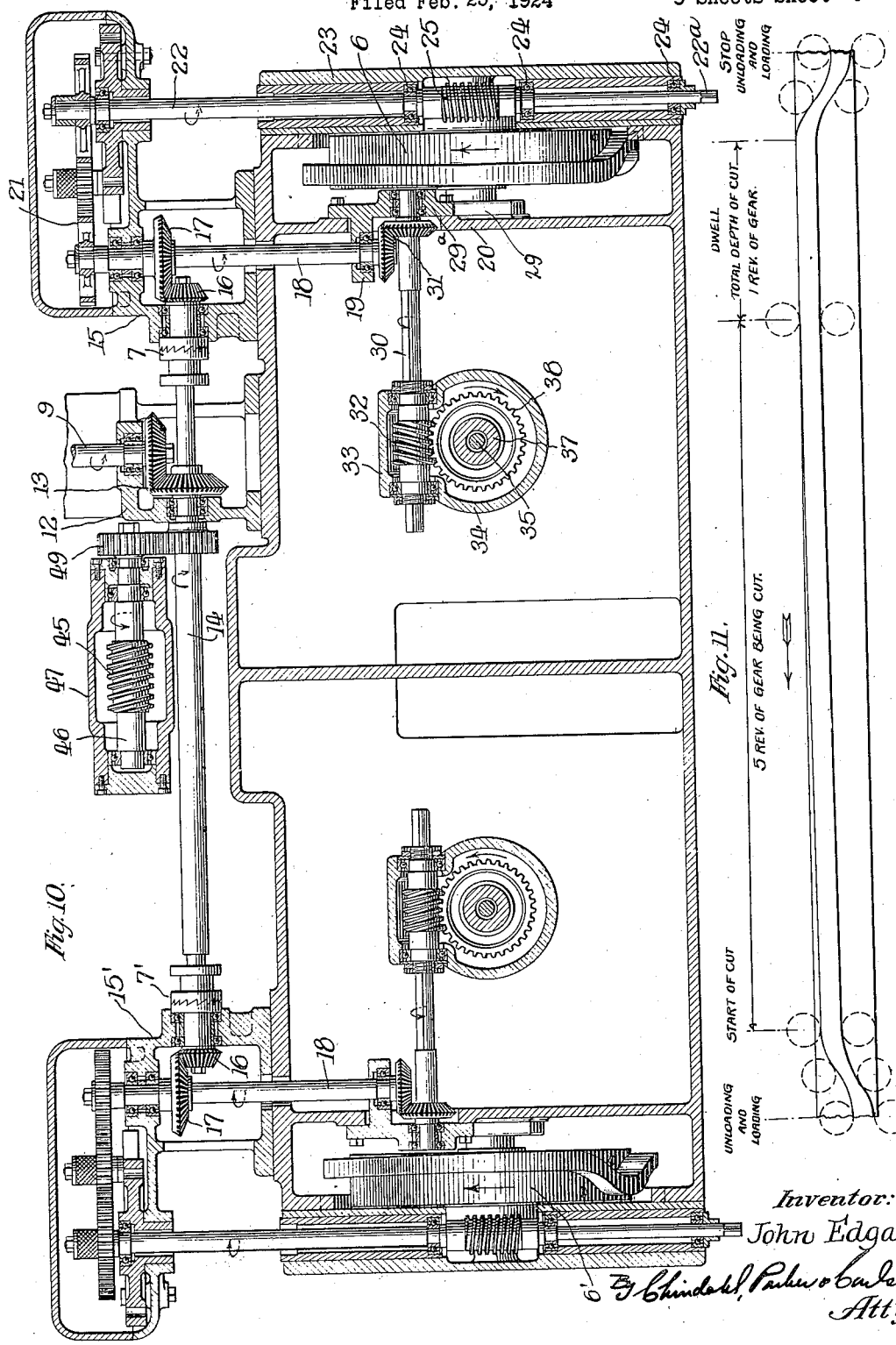

Sept. 6, 1927. 1,641,666
J. EDGAR
GEAR ROUGHING MACHINE
Filed Feb. 25, 1924 9 Sheets-Sheet 7

Inventor:
John Edgar,
By Lindahl, Parker & Carlson
Att'ys.

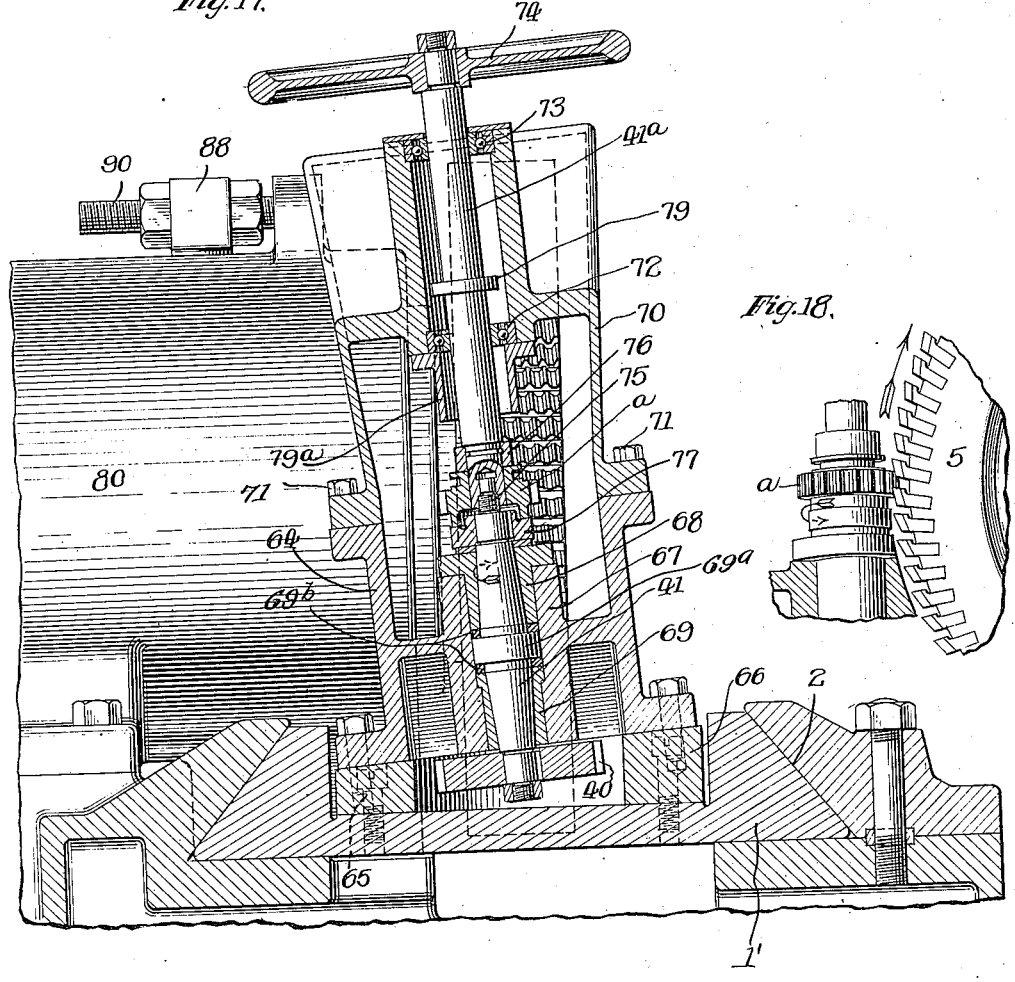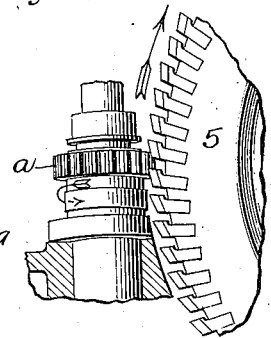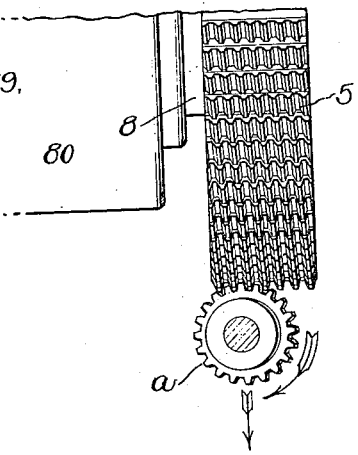

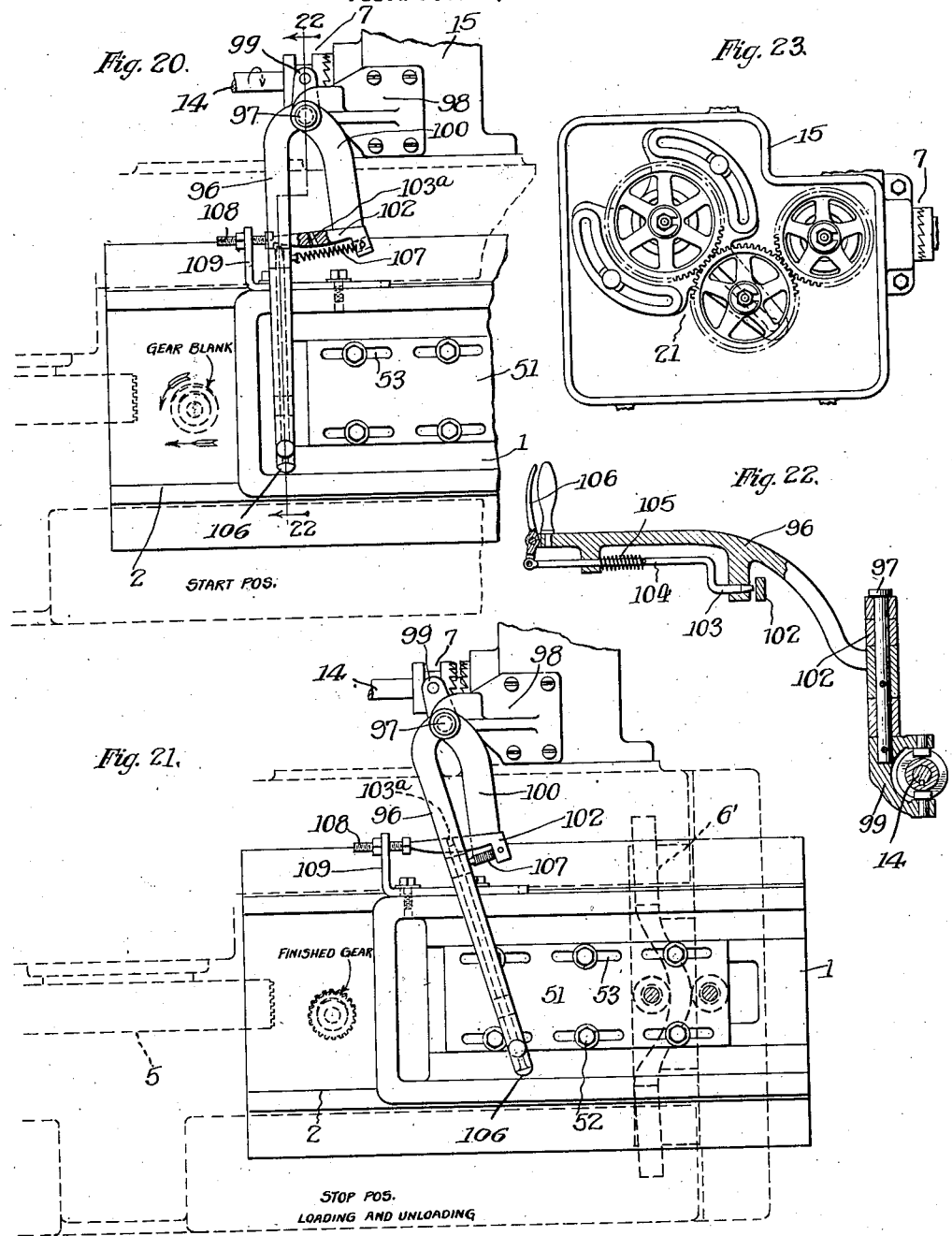

Patented Sept. 6, 1927.

1,641,666

UNITED STATES PATENT OFFICE.

JOHN EDGAR, OF ROCKFORD, ILLINOIS, ASSIGNOR TO BARBER-COLMAN COMPANY, OF ROCKFORD, ILLINOIS, A CORPORATION OF ILLINOIS.

GEAR-ROUGHING MACHINE.

Application filed February 25, 1924. Serial No. 694,916.

My invention relates to the manufacture of gears and has for its aim the production of a machine which will reduce the cost of manufacture by a rapid preliminary or roughing operation upon the gear blanks so as to facilitate the final gear-cutting operation.

Gear hobbing machines now in use in the manufacture of spur gears employ the method which consists in producing a relative feed movement between the hob and the gear blank in a direction parallel to the axis of rotation of the blank. In the manufacture of worm wheels, on the other hand, the hob, having its axis disposed at right angles to the axis of the gear blank, is moved radially into engagement with the periphery of the blank. In this instance, the time consumed in the cutting operation is substantially less than in the case of the feed employed in the manufacture of spur gears.

Because of the relative rapidity with which teeth may be formed by the radial feed method, I utilize this method in roughing spur gear blanks, and in order to reduce to a practical minimum the concavity of the peripheral surface of the partially completed gear I employ a hob of large diameter as compared to the thickness of the gear blank.

The primary object of my invention is to produce a machine for performing the preliminary roughing operation above referred to, which is of a practical character, and which employs the radial feed method so as to render it possible to perform the roughing operation at relatively high speed.

A further object is to produce a machine in which it is possible to operate upon two blanks fed into engagement with opposite sides of the rotating cutter, thus further increasing the capacity of the machine.

Another object is to provide a machine which is constructed to permit of easy adjustment for the purpose of operating upon gear blanks of various sizes.

Still another object is to provide novel means for moving the work into and out of engagement with the cutter, and means associated with the feeding means for rotating the work.

Still another object is to provide a machine of the character indicated in which either one or two blanks may be operated upon at the will of the operator, and in which means is provided for automatically stopping the work holders upon the completion of the roughing operation to permit the removal of the work and the insertion of new blanks for the next operation.

In the accompanying drawings, wherein I have illustrated a preferred embodiment of my invention:

Figure 1 is a plan view of the machine.
Fig. 2 is a front elevational view.
Fig. 3 is a rear side view.
Figs. 4 and 5 are end views looking from the right and left hand ends, respectively, of the machine, as shown in Fig. 1.
Fig. 6 is a fragmentary vertical sectional view taken substantially in the plane of line 6—6 of Fig. 4 on an enlarged scale.
Fig. 7 is a fragmentary vertical sectional view taken in the plane of line 7—7 of Fig. 2, also upon an enlarged scale.
Fig. 8 is a fragmentary vertical sectional view on an enlarged scale of the means shown in Fig. 6 for driving the work-holding spindle.
Fig. 9 is a fragmentary underside view illustrating a means for adjusting a worm wheel spindle.
Fig. 10 is a horizontal sectional view through the machine, illustrating the driving mechanism for the various movable parts.
Fig. 11 is a view illustrating the development of one of the feed cams and showing the sequence of operations.
Fig. 12 is a fragmentary vertical sectional view taken substantially in the plane of line 12—12 of Fig. 2 and showing one of the work-holding fixtures.
Fig. 13 is a fragmentary vertical sectional view illustrating the relative positions of the cutter and the work at the end of the feeding movement.
Figs. 14, 15 and 16 are diagrammatic views illustrating the operation of roughing a gear blank.
Fig. 17 is a fragmentary vertical sectional view taken in the plane of line 17—17 of Fig. 2, the work-holding fixture being shown in section.
Fig. 18 is a view similar to Fig. 13 but showing the cutter engaging with the work on the left side of the cutter.
Fig. 19 is a view similar to Fig. 16 but showing the work on the opposite side of the cutter from that shown in Fig. 16.

Figs. 20 and 21 are fragmentary plan views illustrating the means for automatically stopping the carriages which support the work-holding fixtures, and also interrupting the rotation of the fixtures in inoperative positions at the completion of the roughing operations, the parts being shown in different operative positions in the two views.

Fig. 22 is a fragmentary vertical sectional view illustrating the details of construction of the clutch-operating lever shown in Figs. 20 and 21, the view being taken on line 22—22 of Fig. 20.

Fig. 23 is a fragmentary rear side view of the change speed gearing for driving one of the feed cams.

Figure 12:
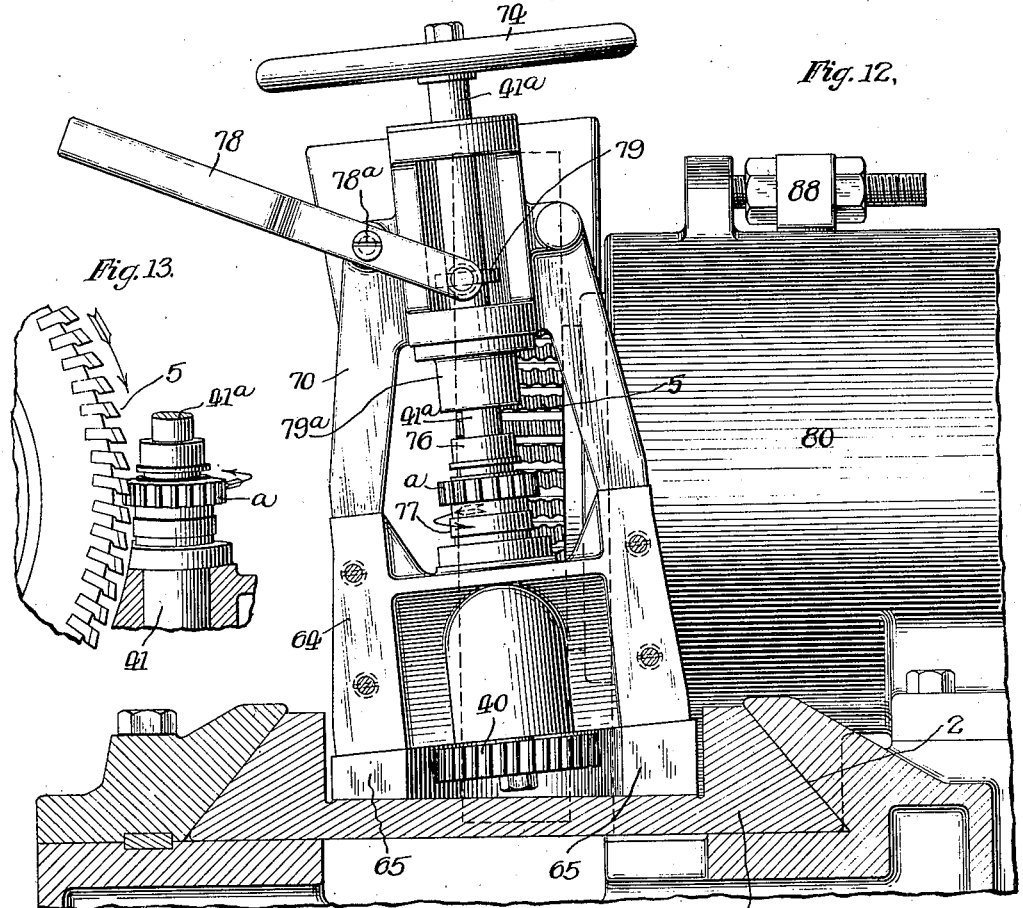
Figure 13:
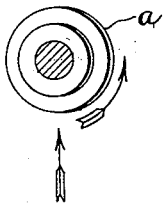
Figure 14:
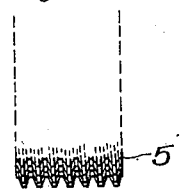
Figure 15:
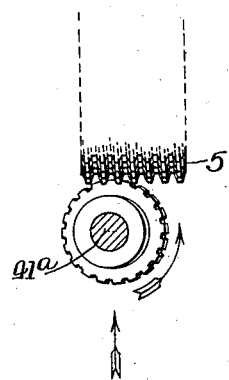
Figure 16:
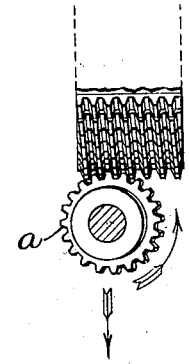

The machine which I have selected for purposes of illustration may be termed a double-ended machine in that the construction at opposite ends is substantially duplicated so as to render it possible to operate upon two blanks moved into and out of engagement with the opposite sides of the hob. To support the work for such movement, I provide two longitudinally movable carriages 1 and 1' each of which is mounted for movement in ways 2 (Figs. 4 and 5) on the upper side of the elongated base 3. At the inner end of the carriages 1 and 1' are provided means including work-holding fixtures 4 and 4' respectively (Fig. 2) for supporting the work for rotation while it is being moved radially into and out of engagement with the hob. The latter, in the present instance, is indicated by the numeral 5 and is mounted to turn on an axis extending transversely of the machine and midway of the length of the bed 3. A pair of cams 6 and 6' (Fig. 10) for reciprocating the carriages 1 and 1' are mounted at opposite ends of the base and connected with a suitable source of power by means including clutches 7 and 7'. Said clutches also are arranged to control the rotation of the blank spindles comprised in the work-holding fixtures 4 and 4'; but the hob 5 is continuously driven by means providing a constant gearing connection between a driven shaft and a spindle 8 (Fig. 7) carrying the hob.

Referring now to Figs. 1 and 10, 9 designates a shaft to which power is applied as by means of a pulley 10 and belt 10ᵃ under the control of a clutch 11 having a forwardly extending operating lever 11ᵃ. The forward end of said shaft 9 is journalled in the present instance in a gear housing 12 rigid with the base at the rear side thereof, and said end of the shaft is connected by bevel gearing 13 with a longitudinally extending shaft 14 journalled between its ends in the housing 12 and having its extreme ends rotatably supported in housings 15, 15', at opposite ends of the base. At each end of the shaft 14 is mounted a bevel gear 16 arranged for connection and disconnection with the shaft through the clutch 7 or 7', and each of said gears 16 meshes with a gear 17 fast upon a shaft 18 which is journalled at its rear end in the housing 15 or 15', as the case may be.

Referring now to the right hand end of the machine (Fig. 10) the forward end of the shaft 18 is journalled in a bearing 19 suitably supported on an inner upright wall 20 formed integral with the base, and the rear end of the shaft 18 is connected by a change speed gear train 21 of suitable construction with a parallel shaft 22. The rear end of said shaft 22 is mounted in a lateral extension of the housing 15 and its forward end passes through an elongated member 23 and is squared as at 22ᵃ to receive a crank for purposes of manual operation. The shaft is supported in the member 23 at spaced intervals by means of bearings 24 and between two of such bearings 24 is secured a worm 25 meshing with a worm wheel 26 (Fig. 6) rigid with the cam 6. The latter is rotatably supported in a chamber at the end of the base through the medium of spaced roller bearings 27 on a shaft 28 which is suitably mounted in the base. Herein the shaft 28 is shown as being supported at one end in a plate 29 on the end wall 20 of the base and at its other end by a removable end plate 20ᵃ closing the cam chamber. Preferably a pair of rollers 29ᵃ are mounted upon the base so as to engage with opposite sides of the cam adjacent the point of engagement between the cam and the carriage as hereinafter set forth.

The plate 29 (Fig. 10) has a forward extension to form the member 19 which supports the forward end of the shaft 18. Also, said plate supports one end of a shaft 30 which is connected by bevel gearing 31 with the shaft 18 for rotation by the latter. At its inner end the shaft 30 has a splined connection with a worm 32 mounted in a rearward extension 33 of a casing 34 (Fig. 6) rigidly secured to the underside of the carriage 1. A shaft 35 (Fig. 8) which normally is fixed in position has its lower end supported in the bottom of the casing 34 and its upper end supported in the carriage 1. Journalled on said shaft 35 is a sleeve or tubular shaft 37 rigid with which is a worm wheel 38 with which the worm 32 is arranged to mesh. The sleeve 37, in turn, is connected by gears 39 and 40 (Fig. 6) with the lower section of a spindle 41 constituting a part of the work-holding fixture. As pointed out hereinafter, the axis of the blank spindle is inclined from the vertical to correspond with the angle of helix of the hob. The gear 40 on the blank spindle is therefore made spiral of the same angle as the helix angle of the hob so that it shall mesh with the spur gear 39 on the index worm gear sleeve or shaft 37. For the purpose of adjusting the position of the worm wheel 38 with respect to the worm 32, so as to insure that these gears shall mesh properly, I preferably support the ends of the shaft 35 upon studs 42 and 42ª (Fig. 8) which are eccentric with relation to the tubular shaft 37, said studs being journalled in the carriage and in the lower end of the casing 34. To the lower end of the shaft 35 is fixed a slotted member 43 (Figs. 6 and 9). A bolt 44 entered through the slot of said member is arranged to clamp it and hold the shaft in the desired position of adjustment.

It will be seen that the rotation of the carriage-reciprocating cam 6 and of the blank spindle 41 is under the control of the clutch 7, since the latter is interposed between the driven shaft 9 and the shaft 18 with which the cam and the blank spindle are both connected. By a similar construction and arrangement the cam 6' and the blank spindle of the work holding fixture 4' are under the control of the clutch 7'.

The hob 5, however, is constantly driven by a continuous connection between its spindle 8 and the shaft 14. This connection comprises in the present instance a worm 45 (Figs. 7 and 10) fast upon a shaft 46 which is journalled at its opposite ends within an elongated section 47 of a gear case 48 at the rear side of the machine. Said shaft 46 projects from one end of the portion 47 of the case and is connected by a gear train 49 with the shaft 14. A worm wheel 50 (Fig. 7) on the hob spindle 8 meshes with the worm 45.

The carriage 1 is connected with the cam 6 for movement thereby through the medium of a plate 51 (Fig. 6) which is secured upon the upper side of the carriage as by means of screws 52 entered in slots 53 (Fig. 1) and anchored in the carriage. Approximately centrally of the carriage there is provided an aperture 54 (Fig. 6) through which depends a portion 55 on the plate 51 having secured upon its under side on studs 56 a pair of rollers 57 which are spaced apart in order to receive between them the peripheral portion of the cam 6. Rigid with the plate 51 is an upstanding nut 58 with which the threaded end 59 of an adjusting screw 60 engages. Said screw is rotatable in a head 61 mounted upon the end of the carriage, but is held against longitudinal movement in said head by means of spaced collars 62 and 63. After loosening the nuts 52, it will be observed, the carriage 1 may be adjusted longitudinally with respect to the plate 51 by means of a crank applied to the square end of the screw 60. Thus it is possible to adjust the position of the carriage in accordance with blanks of various diameters.

The carriage 1' with its work-holding fixture is actuated by means similar in all substantial respects to that explained in connection with the carriage 1, so that a description of such means is unnecessary. Also the work-holding fixtures 4 and 4' are substantially identical in construction so that a description of one will suffice. The fixture 4' comprises a lower section 64 (Figs. 2 and 17) rigidly secured upon the inner end of the carriage and supported upon blocks 65 and 66 having their upper surfaces inclined so as to impart to the fixture the proper degree of inclination with respect to the angle of helix of the hob in accordance with the pitch of the gear being cut, the number of threads on the hob, etc. In said lower section 64 of the fixture, concentrically thereof, is a tubular member 67 (Fig. 17) carrying journal boxes 68 and 69 in which is mounted the lower section 41 of the spindle 69ª is a collar on the spindle 41 between the bearings 68 and 69. Thrust washers 69ᵇ are interposed between collar 69ª and the adjacent ends of said bearings.

Upon the lower section 64 of the fixture is mounted an upper section 70 secured in position as by means of screws 71. Both of said sections are shaped to provide a guard for one side of the hob 5, a similar guard being provided by the fixture on the other side of the hob (see Fig. 2). In the reduced end of the upper section 70 is mounted the upper section 41ª of the spindle. Suitable bearings 72 and 73 support the spindle section 41ª for up and down and rotary movement, its upper end being provided with a hand wheel 74.

The two sections 41 and 41ª of the spindle are arranged to clamp a gear blank $a$ between them, and to this end the lower section 41 has a screw-threaded upper extension 75 which is arranged to enter the lower internally screw-threaded end of the upper section 41ª. The respective sections carry clamping members 76 and 77 held against endwise movement, and the arrangement is such that the gear blank may be placed upon the lower end of the upper section 41ª below the clamping member 76. To facilitate such insertion of the work, the fixture is constructed to provide an opening 77ª (Fig. 6) in its outer side through which access may be had to the mid-portion of the spindle.

A lever 78 (Fig. 12) is pivotally mounted between its ends at 78ª upon the upper section 70 of the fixture, and its rear end has a pivotal but sliding engagement with a collar 79 upon the upper section 41ª of the spindle. By the operation of said lever 78 the two sections of the spindle may be separated, assuming, of course, that the hand wheel 74 has been operated to disconnect the sections at their adjoining ends. A gear blank may then be readily placed upon the lower end of the section 41ª, after which the lever 78 may be operated to lower the spindle section 41ª into engagement with the section 41, the blank being then clamped in position by operation of the hand wheel. If the work should stick to the upper spindle it may be removed by operating the lever 78 to carry it into engagement with a tubular stripper member 79ª rigid with the stationary portion 70 of the fixture.

The hob spindle 8 (Fig. 7) is mounted on the base within a head 80 which also carries at its rear end the housing 48 that encloses the worm wheel 50 of the spindle drive mechanism. As shown in Fig. 7, the hob is bolted to a flange 81 on the spindle 8. Near the forward end of the spindle is a tapered bearing surface 82 fitting within a bearing 83 fixed in a sleeve 84. An oppositely tapered bearing member 85 is splined upon the spindle 8 and fits within a bearing 86 fixed in the sleeve 84.

A nut 87 screw-threaded upon the spindle and engaging the bearing member 85 serves to hold the bearing surface 82 and the bearing member 85 in proper running engagement with the bearings 83 and 86, respectively, and take up wear.

The sleeve 84 is slidable within the head 80 and has rigid therewith a block 88 projecting radially through an aperture 89 in the head 80 and having at its upper end an adjusting screw 90 engaging at one end with a lug 91 on the head 80. The screw is provided on opposite sides of the block 88 with a pair of adjusting and locking nuts 92. By the construction provided the hob-supporting member 84 may be readily adjusted longitudinally in the head 80. As indicated in Figs. 3 and 7, the worm wheel 50 is connected to the spindle 8 by means of two splines 93.

Referring now to the cams 6 and 6' for reciprocating the carriages 1 and 1', their form is shown in Fig. 11. Initially the carriage is moved rapidly from the loading position to a point close to the hob. Thereupon the carriage is fed inwardly at low speed until the desired depth of cut is obtained, this being accomplished in the present instance in five revolutions of the gear blank. The feeding of the work is now suspended during one revolution thereof at the end of which the carriage is moved outwardly at a relatively high speed to an inoperative position for the purpose of unloading the completed work and loading new work upon the work spindle.

The chips produced in the cutting operation are permitted to discharge through the openings 94 and 94ª in the base (Fig. 6) and into a removable chip pan 95 (Fig. 2).

In the present instance I have provided means for stopping the two carriages independently of each other, in such inoperative positions, and also interrupting the rotation of the work spindles. This means comprises the clutches 7 and 7' and means controlled by the movement of the carriages to their said inoperative positions to actuate said clutches.

Thus, referring to the plan views forming Figs. 20 and 21, I have shown a forwardly extending lever 96 pivoted at its rear end at 97 in a bracket 98 secured upon the upper side of the housing 15 (Fig. 1). Rigid with said lever is a rearwardly extending clutch-shifting yoke 99 (Fig. 22). A forwardly extending arm 100 is pivoted on the axis 97. The arms 96 and 100 are arranged to be adjustably connected together by the following means. Rigid with the arm 100 is a member 102 against which a locking pin or detent 103 on a rod 104 carried by the arm 96 is adapted to bear, the member 102 having an aperture 103ª therein to receive the detent, as in Fig. 21. A spring 105 (Fig. 22) normally holds the detent 103 in the aperture 103ª and a hand lever 106 pivoted at the free end of the lever 96 is connected with the forward end of the rod 104 so as to enable the latter to be operated manually. The member 102 is connected by a contractile spring 107 with the lever 96. The free end of the member 102 is arranged to be engaged by a trip consisting of a screw 108 carried by a bracket 109 on the carriage.

The operation is as follows:

Assuming that the operator has actuated the main control clutch 11 through the medium of the hand lever 11ª (Fig. 1) to start the machine in operation, and also that one of the carriages, for example, the carriage 1, is in its inoperative position (as shown in Fig. 21), the previously roughed gear is removed and a new blank inserted in position between the sections of the corresponding work-holding spindle. This is accomplished by operating the hand wheel 74 to effect a disconnection between the two sections of the spindle, whereupon the sections are separated by the operation of the lever 78 to permit the withdrawal of the work and the insertion of a new blank. When the latter has been clamped in position, the control lever 96 is unlatched from the member 102 and swung to the left to throw in the clutch 7, the handle being swung in such operation into the position shown in Fig. 20. The pressure between the clutch elements serves to hold them in engagement. The cam 6 now causes the carriage 1 to move inwardly and, the spring 107 being under tension, the member 102 follows the trip 108 inwardly until the aperture 103ª in the member 102 occupies a position to receive the detent 103, whereupon the detent springs into the aperture thus effecting an interlocking of the member 102 with the lever 96.

In the initial portion of the rotation of the cam 6 the carriage moves inwardly at a relatively high speed until the blank occupies a position such as to be engaged by the revolving hob 5. The inward feeding movement now becomes more gradual, and in the present instance teeth are cut upon the blank in six revolutions thereof. During the sixth revolution of the blank the carriage remains stationary so as to make the cut uniform throughout the entire periphery of the work. At the end of the sixth revolution the cam reverses the movement of the carriage and causes it to move at a relatively high speed into its initial or inoperative position.

As the carriage approaches such initial position the trip 108 striking the member 102, now locked to the lever 96, imparts a swinging movement to the latter such as to disengage the clutch 7. The result is that the carriage comes to rest and the workholding spindle also ceases to revolve, thus permitting of the removal of the completed work and the insertion of a blank as above described.

It will be apparent that because of the adjustment provided between the carriages 1 and 1ª and their respective cams it is possible to operate upon blanks of different diameters, and that inasmuch as the opposite ends of the machine are subject to independent control, though actuated by a common drive mechanism it is unnecessary that both pieces of work be operated upon simultaneously thus permitting the operator to attend to opposite ends of the machine successively. By the time the operator has removed a roughed out gear, substituted a gear blank and restarted the carriage at one end of the machine, the other carriage has completed, or nearly completed, a cycle of operations, so that the operator's time is substantially fully occupied.

In the mounting of the work upon the carriages, as distinguished from spindles mounted in the body of the machine, I have produced self-contained work-holding fixtures which lend themselves to compactness in the construction of the machine.

I claim as my invention:

1. A gear roughing machine comprising, in combination, an elongated base, a hob mounted to rotate on a fixed axis extending transversely of the base, a carriage mounted for longitudinal movement upon the base at each side of said hob, a work-holding fixture on each of said carriages including a work spindle, a constantly driven shaft, a pair of cams for reciprocating said carriages toward and away from the hob, means associated with said cams to revolve said spindles, and control means including a clutch interposed between said constantly driven shaft and each of said cam driving means.

2. A gear roughing machine comprising, in combination, two longitudinally movable carriages, a pair of cams for reciprocating the respective carriages, a constantly driven shaft, means having a clutch controlled connection with said shaft for rotating the respective cams, and work-holding fixtures on the respective carriages having work spindles operatively connected with said cam driving means.

3. In a gear roughing machine, the combination with a hob, a constantly driven shaft with which said hob is operatively connected, a pair of work-holders, feeding means for moving said holders to carry the work into engagement with the hob radially of the latter, means for rotating the work holders during such feeding movement, and means including separate clutches for the respective feeding means for controlling the connection between said shaft and the feeding means.

4. In a gear roughing machine, the combination of a hob mounted to rotate on a fixed axis, a carriage mounted for movement in a direction perpendicular to the axis of the hob, a work-holding fixture on the carriage including a spindle, a driven shaft, a cam operatively associated with the carriage for reciprocating the carriage toward and away from the hob, means for rotating said cam including a pair of parallel shafts, and means associated with one of said shafts for rotating the spindle including means adapted to permit of the movement of the spindle with the carriage.

5. In a gear roughing machine, the combination of a hob mounted to turn on a fixed axis, a carriage mounted for reciprocation in a direction perpendicular to the axis of the hob, a work-holding fixture on the carriage, and means for reciprocating the carriage including a member adjustable longitudinally with respect to the carriage, a pair of rollers on said member, and a cam engaging between said rollers.

6. In a gear roughing machine, the combination of a base, a carriage mounted to slide on said base, a hob mounted to turn on a fixed axis perpendicular to the direction of movement of the carriage, a work-holding fixture on said carriage, and means for reciprocating the carriage including a member adjustable longitudinally thereof, and cam means operatively engaging said member.

7. In a gear roughing machine, the combination of a hob mounted to turn on a fixed axis, a work-holding fixture mounted for movement to carry the work radially into engagement with the hob, means for rotating the work in said movement, an actuating member for the carriage, and an adjustable connection between said member and the carriage.

8. In a gear roughing machine, the combination with a base, a carriage mounted to slide on said base, a hob mounted to turn on a fixed axis, means including a spindle mounted on the carriage and adapted to hold the gear blank for movement into and out of engagement with the hob in the movements of the carriage, means for moving the carriage, and means for rotating said spindle in the movement of the carriage including a worm, and a worm wheel mounted for adjustment toward and away from said worm and operatively connected with said spindle.

9. In a gear roughing machine, the combination of a hob mounted to turn on a fixed axis, a carriage movable in a direction perpendicular to said axis, means for moving said carriage including a cam, a member on the carriage adjustable relative thereto and operatively associated with said cam, and means for adjusting said member on the carriage.

10. A gear roughing machine having, in combination, a hob mounted to turn on a fixed axis, a carriage mounted for movement in a direction perpendicular to the axis of the hob, work-holding means on the carriage, means for moving the carriage to carry the work into and out of engagement with the hob, and means operable automatically in the return movement of the carriage to bring it to rest.

11. In a gear roughing machine, the combination of a hob mounted to turn on a fixed axis, a carriage mounted for movement in a direction perpendicular to the axis of the hob, work-holding means on the carriage, means operable to reciprocate the carriage including a cam, and means for controlling the movements of the carriage by said cam including a clutch having means for manually operating it and means operable in the movement of the carriage to actuate it automatically.

12. In a gear roughing machine, the combination of a hob, a carriage having a work-holding fixture thereon and movable to carry the work into engagement with the hob radially thereof including a cam, a constantly driven shaft, means connecting said shaft with said cam including a clutch, and means operable in the movement of the carriage away from the hob to actuate said clutch.

13. In a gear roughing machine, the combination of a hob, a carriage having a work-holding fixture thereon and movable to carry the work into engagement with the hob radially thereof including a cam, a constantly driven shaft, means connecting said shaft with said cam including a clutch, and means operable in the movement of the carriage away from the hob to actuate said clutch, the last-mentioned means being operable manually to cause the carriage to move toward the hob.

14. In a machine of the character described, the combination of a reciprocatory carriage, means for reciprocating the carriage including a clutch, a lever for operating the clutch, a member movable with respect to said lever, means operable as the carriage moves in one direction for locking said member to said lever, and means operable as the carriage moves in the opposite direction to actuate said lever through said member whereby to disengage the clutch.

15. A gear roughing machine comprising, in combination, an elongated base, a driven shaft extending longitudinally of the base, a pair of cams mounted in the base at opposite ends thereof and having their axes parallel with said shaft, a hob spindle mounted transversely of the base substantially midway between its ends and operatively connected with said shaft, a pair of carriages mounted on the base at opposite ends thereof for movement in a direction perpendicular to the axis of the hob, means operatively connecting said cams with said carriages, work-holding fixtures mounted on the carriages for movement therewith and including work spindles, means connecting said spindles with said shaft adapted to permit of the movement of the spindles with the carriages, and means connecting said cams with said spindle driving means.

16. A gear roughing machine comprising, in combination, an elongated base, a driven shaft extending longitudinally of the base, a pair of cams mounted in the base at opposite ends thereof and having their axes parallel with said shaft, a hob spindle mounted transversely of the base substantially midway between its ends and operatively connected with said shaft, a pair of carriages mounted on the base at opposite ends thereof for movement in a direction perpendicular to the axis of the hob, means operatively connecting said cams with said carriages, work-holding fixtures mounted on the carriages for movement therewith and including work spindles, means connecting said spindles with said shaft adapted to permit of the movement of the spindles with the carriages, and means associated with the opposite ends of said shaft for actuating said cams.

17. In a gear roughing machine, the combination of a base, a stationary head on the base, a hob spindle journalled in said head, a driven shaft extending longitudinally of the base at the rear side thereof and operatively connected with said spindle, a carriage mounted on the base for movement in a direction perpendicular to the axis of said hob spindle, work-holding means on said carriage, means for actuating the work-holding means to rotate the work relative to said hob including a forwardly extending shaft connected with said driven shaft, and means for reciprocating the carriages including a second forwardly extending shaft also arranged to be driven from said driven shaft.

18. In a gear roughing machine, the combination of a base having an aperture in its upper side, a carriage mounted on the base, a housing secured to the underside of the carriage and depending through said aperture, a work-holding spindle mounted in the carriage, driving means for said spindle including an upright member having its upper end in gearing connection with the spindle and having a worm wheel at its lower end, a driven shaft mounted in the base, and a worm having a splined connection with said shaft and arranged to mesh with said worm wheel.

19. In a gear roughing machine, the combination of a hob, a carriage mounted for movement in a direction perpendicular to the axis of the hob, a work-holding fixture mounted on the carriage and including a spindle adapted to clamp a piece of work for engagement by said hob, said fixture being constructed to provide on the side of the fixture opposite the hob an opening through which access may be had to the work.

20. A gear roughing machine comprising, in combination, a base, a hob mounted on an axis extending transversely of the base substantially midway between its ends, work-supporting carriages at opposite ends of the base movable to carry the work radially into and out of engagement with the hob, means for reciprocating said carriages, and means for controlling the last-mentioned means manually operable to start the carriage to cause it to move the work into engagement with the hob and to return it to an inoperative position and automatically operable to stop the carriage when in such inoperative position.

21. In a gear roughing machine, the combination of a hob, a carriage, means on said carriage for rotatably supporting the work, and means for moving the carriage to cause the work to move radially into and out of engagement with said hob, said means including a cam operable to move the carriage initially at a relatively high speed until the work is engaged by the hob, then at a slow or feeding speed, then holding the carriage stationary for a predetermined interval, and finally withdrawing the work at a relatively high speed.

22. A gear-hobbing machine having, in combination, a hob, a carriage reciprocable toward and away from the hob in a direction perpendicular to the axis of the hob, a work-spindle on the carriage, mechanism for reciprocating the carriage and for rotating the work spindle in timed relation to the hob, a clutch controlling said mechanism and manually operable to start the carriage and the work spindle, and means for automatically operating said clutch to stop the carriage in inoperative position and the work-spindle upon the completion of one to and from reciprocation of the carriage.

In testimony whereof, I have hereunto affixed my signature.

JOHN EDGAR.